UNITED STATES PATENT OFFICE.

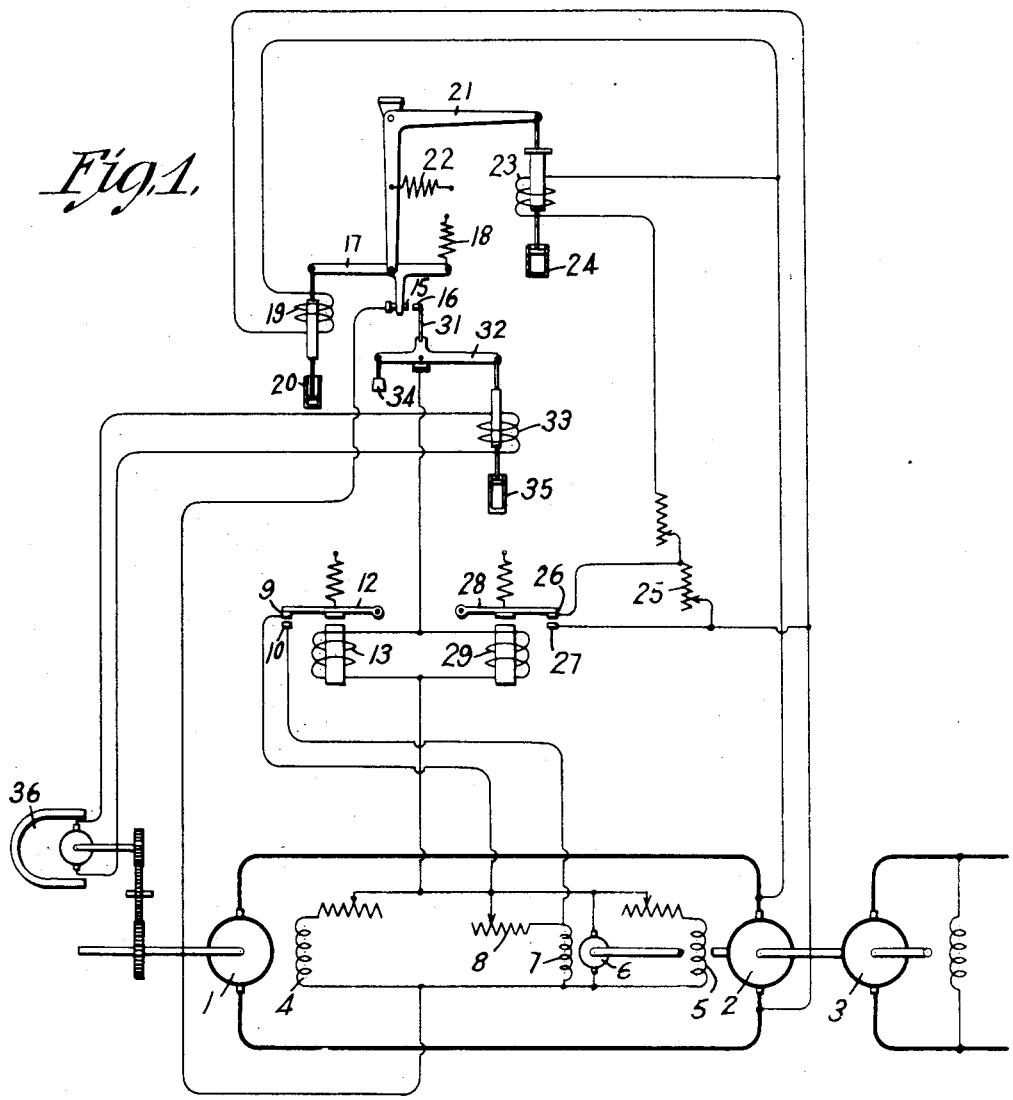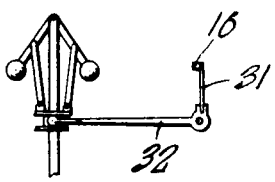

ALLEN A. TIRRILL, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL REGULATING SYSTEM.

1,305,031.  Specification of Letters Patent.  Patented May 27, 1919.

Application filed May 6, 1915. Serial No. 26,304.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulating Systems, of which the following is a specification.

My invention relates to electrical regulators, and it has for its object to provide a regulator for maintaining the speed of a motor substantially uniform.

It is frequently desirable to maintain substantially uniform the speed of a motor that is employed for driving paper mills and similar apparatus. Such motors are ordinarily supplied with current from local generators, and, according to the present invention, the speed of the motor is regulated by means that are responsive both to the speed of the motor and to the voltage applied to it by the generator.

Figure 1 of the accompanying drawing diagrammatically illustrates a system embodying my invention, and Fig. 2 similarly illustrates a modified form of a part of the regulator.

In the system of Fig. 1, current is delivered to the armature 1 of a motor, to be utilized in driving a paper mill or any other suitable machine from the armature 2 of a generator that may be driven by a motor 3 or any other suitable prime mover. Exciting current is supplied to the field-magnet windings 4 and 5, respectively, of the mill motor and of the generator from an exciter 6 that may be driven by the motor 3, or by any other suitable means. The exciter is provided with a shunt field-magnet winding 7, in series with which is a regulating resistance 8 having a circuit in shunt thereto that is adapted to be opened and closed by means of coperating contact terminals 9 and 10, respectively, of a relay 12. An actuating electromagnet winding 13 for the relay 12 receives energizing current from the exciter or from any other suitable source.

The circuit of the electromagnet winding 13 is controlled by means of a pair of coperating contact terminals 15 and 16 which constitute parts of the main control element of the speed regulator. The contact terminal 15 is carried by a depending arm of a bell-crank lever 17 that is adapted to be actuated, in opposition to the tension of a spring 18, by means of an electro-magnet winding 19, the movements of the lever 17 being retarded by a dash pot 20. If desired, a counter-weight may be substituted for the spring 18. The bell-crank lever 17 is supported by, and is fulcrumed upon, the lower end of the depending arm of another bell-crank lever 21 that is actuated, in opposition to the tension of a spring 22, by means of an electromagnet winding 23, the movements of the lever 21 being retarded by means of a dash pot 24. The dash pot 24 is preferably so adjusted as to afford a somewhat less retardation than the dash pot 20 in order that the approximate regulation may be effected by the winding 23, and the finer, or more accurate, regulation may be effected by the winding 19.

The electromagnet windings 19 and 23 are connected between the terminals of the armature 2 of the generator and, accordingly, receive current proportional to the voltage applied by the generator to the armature 1 of the mill motor. In circuit with the electromagnet winding 23, however, is a resistor 25 having a circuit in shunt thereto that is adapted to be opened and closed by means of a pair of coöperating contact terminals 26 and 27 of a relay 28. An actuating electromagnet winding 29 for the relay 28 is connected in parallel with the winding 13 of the relay 12, and its energization is also controlled by the contact terminals 15 and 16. The electromagnet winding 23 is thus continuously energized in proportion to the voltage applied to the armature of the mill motor, though its degree of energization is controlled by the relay 28 in such a manner that it causes the contact members 15 and 16 to vibrate into and out of engagement. The winding 23 serves to effect the approximate regulation in accordance with the voltage applied to the mill motor and the winding 19 coöperating therewith, and, because of the adjustments of the dash pots, serves to effect the finer or more accurate regulation.

The contact terminal 16 is preferably resiliently supported, as, for instance, by being mounted upon a plate spring 31 that constitutes a part of one arm of bell-crank lever 32. The said lever is provided with an actuating electromagnet winding 33 and also with a counterweight 34 whereby, when the winding 33 is not energized, the contact terminal 16 is caused to engage the terminal 15. The movements of the lever 32 are retarded by means of a dash pot 35. The winding 33 is supplied with energizing current from a magneto 36 that is driven by the mill motor, 1, and that produces a voltage proportional to the speed of said motor. The magneto 36 may, of course, be replaced by a generator having a field-magnet winding and, if desired, the lever 32 may be actuated mechanically in accordance with the speed of the main motor as, for instance, by means of the common fly-ball governor, as shown in Fig. 2, it being essential only that the actuation of the contact member occur in accordance with the speed of the main motor.

When the contact terminals 15 and 16 are not in engagement, the contact terminals 9 and 10, and also terminals 26 and 27, are disengaged, with the result that the resistor 8 is included in the field circuit of the exciter, which thereupon decreases the excitation of the fields 4 and 5 of the main motor and generator. The generator voltage and motor speed are slightly decreased, the relation of their characteristics being such as to provide for this result, and the contact terminals 15 and 16 are both caused to approach each other, because of the decreased excitations of the coils 19, 23 and 33. Also, when the contact terminals 26 and 27 are disengaged, the winding 23 is not fully energized, and the spring 22 therefore, causes the contact terminal 15 to engage the terminal 16. When this occurs, the windings 13 and 29 become energized, and the contact terminals 9 and 26 engage the terminals 10 and 27, respectively. Upon engagement of the terminals 9 and 10, the resistor 8 is shunted, and the generator voltage and motor speed are correspondingly increased, with the result that the terminals 15 and 16 are moved away from each other by the actuating windings. Upon engagement of the terminals 26 and 27, the winding 23 becomes fully energized, and the terminal 15 is moved out of engagement with the terminal 16.

The regulator continues to operate in this manner, the winding 23 serving to vibrate the contact 15 into and out of engagement with the terminal 16 and, at the same time, because of its continuous energization in proportion to the voltage of the generator, it also serves to effect the approximate regulation. The winding 19 serves to vary the distance between the contact terminals 15 and 16 in accordance with the voltage of the generator, and its effect upon the terminal 15 being somewhat more retarded than that of the winding 23, it serves to effect the finer or more acurate regulation. The final and most exact regulation is effected by the winding 33, that is energized in proportion to the speed of the motor, the position of the terminal 16 being determined by the said winding.

I claim as my invention:

1. The combination with a generator and a motor receiving energy therefrom, of a regulator having a pair of contact terminals for regulating the excitations of the generator and the motor to decrease the motor speed and generator voltage by reducing said excitations, the regulation being independently effected at different rates in accordance with the motor voltage and also independently in accordance with the motor speed.

2. In an electrical regulator, the combination with two coöperating contact members, and three electromagnets adapted to be operated under different conditions, of three levers respectively operated by said electromagnets for governing the operation of said contact members, two of said magnets and the levers associated therewith controlling the operation of one contact member and the third magnet and the lever associated therewith controlling the operation of the other contact member.

3. The combination with a motor, and a supply circuit for the motor, of a regulator for the motor comprising two coöperating contact members, and three actuating devices for said contact members, one of said contact members being responsive to the speed of the motor and the other two devices being responsive to supply-circuit conditions.

4. The combination with a generator, a motor receiving current therefrom, and an exciter for the generator and the motor, of a regulator having a pair of contact terminals for regulating the excitation of the exciter and also having two differently-damped magnet cores energized in accordance with the motor voltage for independently actuating one of said contact terminals and a third magnet core energized in accordance with the motor speed for actuating the other contact terminal.

5. The combination with a generator and a motor receiving energy therefrom, of a regulator having two coöperating contact members, and three actuating devices for said contact members, one of said actuating devices being responsive to the motor speed and the other two actuating devices being responsive to the generator voltage.

6. The combination with a generator, a motor receiving current from the generator, and an exciter associated with the generator and the motor, of a regulator comprising two coöperating contact members for governing the operation of said exciter, and three actuating devices for said contact members, one of said actuating devices being responsive to the motor speed and two of said actuating devices being responsive, in various degrees, to the generator voltage.

In testimony whereof, I have hereunto subscribed my name this 29th day of April, 1915.

ALLEN A. TIRRILL.